Patented Nov. 27, 1934

1,982,186

UNITED STATES PATENT OFFICE 1,982,186

FRYING FAT AND METHOD

Earl B. Working, Tucson, Ariz., assignor to American Lecithin Corporation, Atlanta, Ga., a corporation of Delaware No Drawing. Application June 9, 1931, Serial No. 543,243

7 Claims. (Cl. 99—13)

The present invention relates to a fatty material for use in frying, and has special reference to a frying fat which is especially suitable for deep fat frying, namely, frying in which the material being fried is largely submerged in the fat during the process.

Heretofore lard or lard substitutes have largely been used for frying food materials, and for the purpose of improving certain properties of such fatty materials I have found that the addition of a small percentage of lecithin is very advantageous. Among the advantages of the use of a small amount of lecithin is the fact that the material is rendered more stable, or in other words it does not become rancid and does not develop transparent streaks through the material on standing, even when the fat is kept in a warm room such as a hot kitchen, for a considerable period.

It will be understood that lard compounds are composed entirely of solid oils mixed with liquid oils in such proportion as to produce approximately a lard-like consistency. The material is then usually rendered opaque by the incorporation of more or less gas, which may be air or in some cases a gas which is substantially free from oxygen such as nitrogen or hydrogen, this being added and incorporated, for example during the chilling operation. Such a mixture resembles lard in appearance, consistency, melting point and certain other characteristics, and like lard is opaque. If the material, on standing in a warm room such as a hot kitchen for a protracted period loses its opacity, and becomes transparent or semi-transparent, even if the material has not become rancid, many cooks would consider the material to be deteriorated.

As above stated the addition of a small percentage of lecithin not only prevents the fat from becoming rancid, but also prevents the acquiring of transparent streaks or spots in the material.

The kind of lecithin to be employed is of importance. Up until a few years ago lecithin was largely produced from egg yolk, but lecithin from egg yolk usually has a rather unpleasant flavor or taste and smell, which are difficult to entirely get rid of, without chemical decomposition of a large portion of the lecithin. Lecithin from soybeans, when purified according to known processes is substantially free from unpleasant flavor or taste and smell, but on account of the fact that the lecithin has been obtained from soybeans, which contain considerable amounts of soluble sugars or soluble carbohydrates, such materials may remain in the lecithin to a substantial extent. Lecithin can also be produced by extraction from sweet cream buttermilk or sour cream buttermilk, or other milk products, in a condition largely wholly free from sugars and soluble carbohydrates. The soybean lecithin can also be suitably extracted to remove a large part of its original content of sugars and soluble carbohydrates. Lecithin from sour buttermilk may be wholly free from sugars.

Since lecithin produced from soybeans and lecithin produced from milk products, are derived from materials which in their original state contain sugary or other carbohydrate materials, I hereinafter designate these materials as "lecithin from an original carbohydrate-containing material."

The presence of considerable amounts of sugars or soluble carbohydrates in the lecithin to be added to the frying fat is found to be objectionable, in that when the fat is heated to a high temperature such as is used in frying, there may be produced a considerable amount of blackening of the material fried, and this would be objectionable since the consumers would believe the products to be burned, if the same showed a blackening of the surface.

The percentage of the lecithin can vary substantially, although in all cases I would prefer to use a small percentage. Amounts from about 0.01% up to 0.5% will give entirely satisfactory results, and I recommend the use of about 0.1% as being about the most suitable quantity for use in a frying fat, for most purposes. The lecithin should of course be free from such amounts of sugars and related carbohydrates as would cause blackening of normally light colored edible products, during frying the same in deep fat.

The fatty material or "lard compound" constituting the base of the composition may be any of the usual types, such as a minor percentage of hard fat such as beef stearin or hard hydrogenated oil, with a major proportion of normally liquid edible oil, or it may be a normally liquid oil such as cotton seed oil, corn oil, soy-bean oil, peanut oil or mixtures of these or similar oils with each other, hydrogenated to about a lard-like consistency, or it may be mixtures of either or both of the above with other kinds of edible fats which are of a soft consistency. It will be understood that one essential difference between frying fats ordinarily, and butter or butter substitutes, margarine and the like is that the latter group of materials ordinarily contain a considerable amount of emulsified water (or aqueous material, e. g. milk or skimmed milk), whereas I do not preferably use any emulsified water (or aqueous materials) in the frying fat. Heretofore lecithin has been used in artificial mixtures which contain fatty materials and water, in order to assist in emulsification of the water in the fatty material, but in the present invention lecithin is not used for this purpose, and in fact the frying fats do not ordinarily contain any substantial amount of water. In stating that the fatty material is substantially dry, I do not preclude such traces of water as frequently are present in refined fatty material, left in from the refining processes.

It may be noted that the temperature of the hot fat, during deep fat frying, can vary considerably, due to the different fats used, different food materials being cooked etc., as well as different theories and practices of different cooks. Temperatures substantially over 180° C., are however frequently used, and at such temperatures considerable blackening might occur if the lecithin contains sugars or related materials. At temperatures substantially higher than this certain other impurities, if present in substantial amount, might cause blackening.

I have referred above to the use of lecithin, but it will be understood that the phosphatides generally (e. g. the crude phosphatides from soy bean), when sufficiently free from sugars (e. g. after a sufficient washing with cool water) can be employed.

I have referred above to complete avoidance of blackening. It is also an advantage to employ lecithin or phosphatides which contain only a small percentage of sugars, whereby the degree of darkening during the frying operation is considerably reduced.

As examples of "deep fat frying" as the term is used herein, I mention by way of example, the frying of doughnuts, potato chips, French fried potatoes. In this type of frying, a layer of the hot fat is maintained, deep enough to keep the articles floating about, as distinguished from other frying in which a film or thin layer of grease is in the bottom of the pan and the articles are laid upon the bottom of the pan.

I claim:—

1. A fatty material suitable for use in frying, comprising dry fatty material which melts at above normal room temperature, containing a small percentage of lecithin from an original carbohydrate-containing material, such lecithin being free from such amounts of sugars and related carbohydrates as would cause blackening of normally light colored edible products, during the operation of frying same in the deep fat.

2. A mixture of frying fat, lecithin selected from the herein described group consisting of soybean lecithin and milk lecithin, such product being substantially free from sugar.

3. In preparing foods, the herein described step of frying same in substantially dry fatty material containing a small percentage of lecithin which is free from the characteristic flavor and smell of egg yolk lecithin, and which is sufficiently free from sugars and related carbohydrates, to avoid blackening at ordinary frying temperature.

4. A mixture of frying fat with phosphatides from an original carbohydrate-containing material, sufficiently free from soluble carbohydrates to prevent blackening of light colored foods cooked therein.

5. A mixture of frying fat with phosphatides from an original carbohydrate-containing material, sufficiently free from soluble carbohydrates to prevent blackening of light colored foods cooked therein, such mixture being of lard-like consistency.

6. In preparing foods, the herein described step of frying same in substantially dry fatty material containing a small percentage of phosphatides free from the characteristic flavor and smell of egg yolk lecithin, and sufficiently free from sugars and related carbohydrates, to avoid blackening at ordinary frying temperature.

7. A mixture of frying fat with phosphatides from an original carbohydrate-containing material, sufficiently free from soluble carbohydrates to substantially reduce blackening of light colored foods cooked therein.

EARL B. WORKING.